Patented June 23, 1942

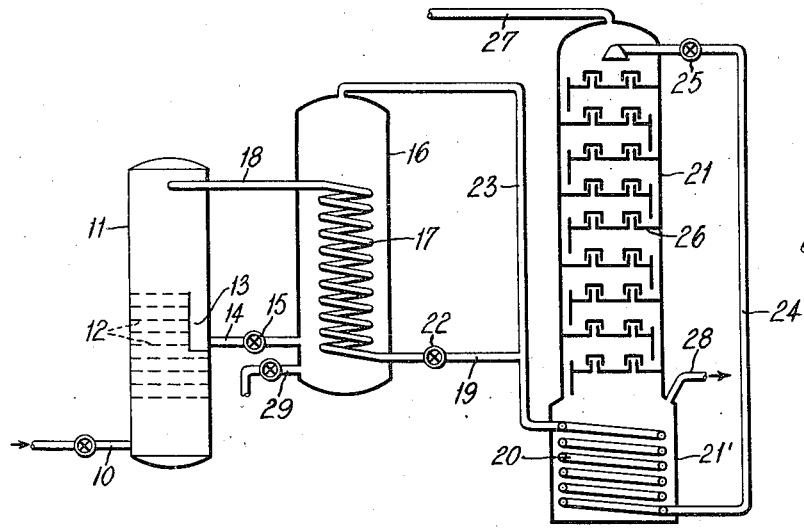
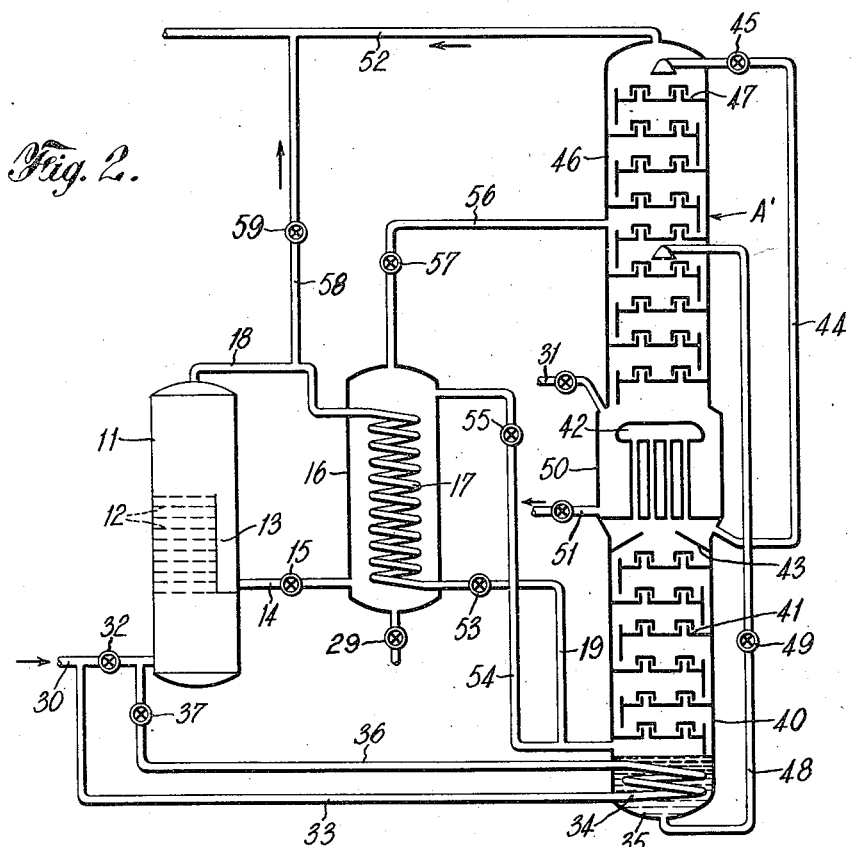

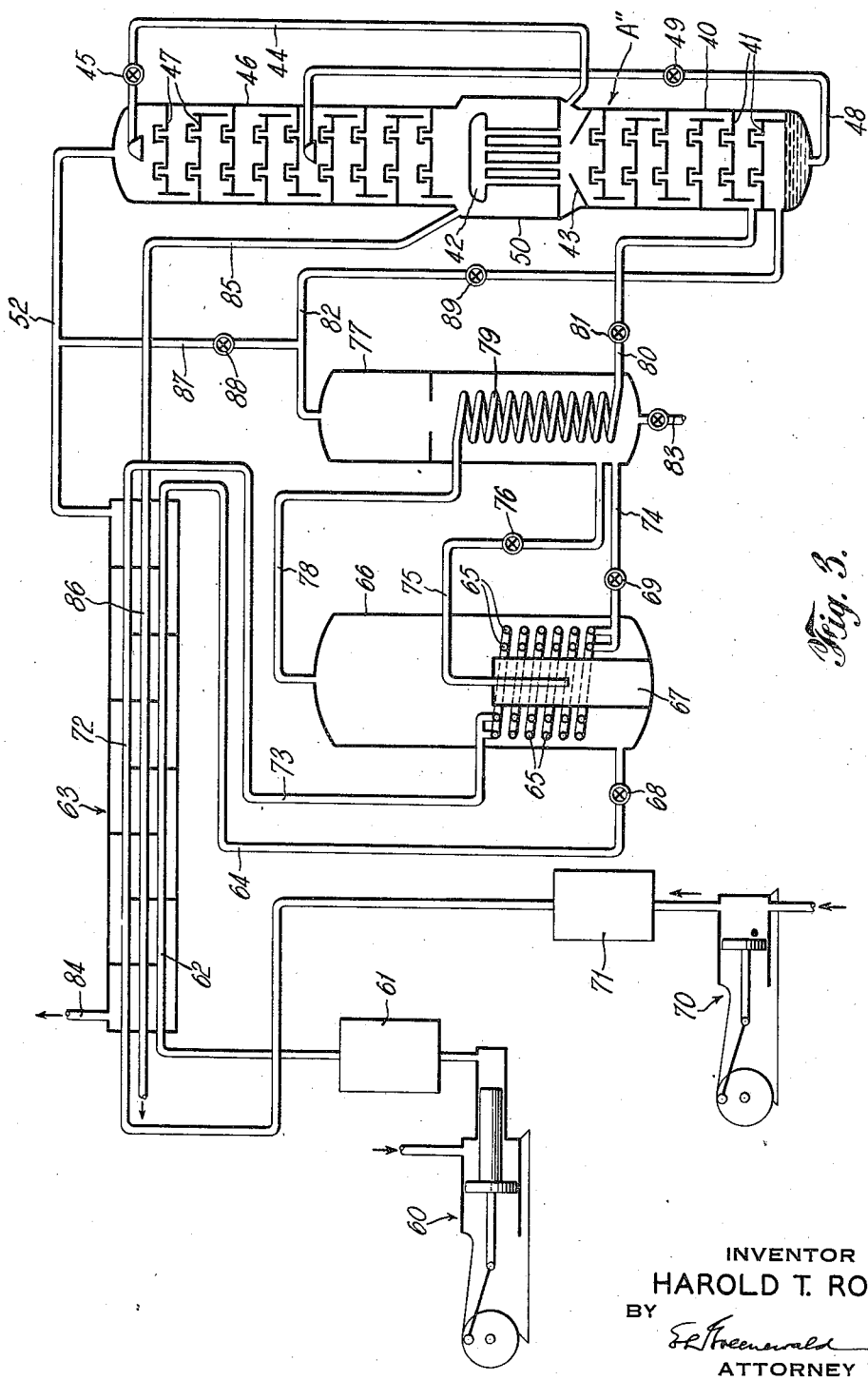

2,287,137

UNITED STATES PATENT OFFICE 2,287,137

METHOD OF AND APPARATUS FOR ELIMINATING IMPURITIES WHEN SEPARATING GAS MIXTURES

Harold T. Ross, Bayside, N. Y., assignor to The Linde Air Products Company, a corporation of Ohio Application November 15, 1940, Serial No. 365,756

19 Claims. (Cl. 62—122)

This invention relates to a method of and apparatus for eliminating relatively higher boiling point impurities when separating gas mixtures of relatively low boiling point into their constituents by rectification. The invention relates more particularly to a method of and apparatus for separating air to provide an oxygen product of relatively high purity substantially free of undesirable impurities having boiling points higher than oxygen.

During the production of commercial oxygen by liquefaction and rectification at low temperatures, certain impurities existing in atmospheric air become concentrated in liquid oxygen particularly in zones where the oxygen is vaporized. Such impurities have boiling points which are substantially above the boiling point of oxygen and include carbon dioxide and minute quantities of various hydrocarbon gases. It has been customary to remove by chemical means the major portion of the carbon dioxide from the air before it is compressed. However, small traces of carbon dioxide may remain in the air and become solidified when the air is liquefied. Such traces of solidified carbon dioxide cause trouble in the air separating and rectifying apparatus. It is very difficult to remove the small traces of hydrocarbon gases from the air before it is compressed because such impurities exist in very minute proportions. Also, additional traces of hydrocarbon are introduced during the compression due to lubrication of the air compressors. After a considerable volume of air is rectified the impurities tend to concentrate to such an extent that they constitute a serious hazard since they are mixed with liquid oxygen of very high purity. Attempts to minimize this hazard have included various procedures for separating the impurities from the liquid oxygen. Such methods, however, do not avoid bringing the hydrocarbons into contact with high purity oxygen.

In the copending application Serial No. 365,816 filed by E. F. Yendall, it is proposed to remove the impurities by effecting their accumulation in a liquefied portion of the air to be separated, separating the gas and liquid phases, and vaporizing such impurity-containing liquid at a low temperature and at the pressure of the low-pressure rectification stage, the impurity-free vapor produced being passed into the low-pressure rectification stage. Such method, however, causes a slight reduction in air-separation efficiency and lower yield of oxygen by interference with the rectification action.

It is a principal object of the present invention therefore to provide methods of and apparatus for eliminating impurities from a gas mixture to be separated by rectification at low temperature. Other objects of the invention are to provide a method of and apparatus for preventing hazardous impurities contained in air from reaching the high purity oxygen zone of an air-separating apparatus and more particularly an air-separation apparatus adapted for the production of liquid oxygen; for preventing impurities having a substantially higher boiling point than oxygen from entering the rectifying column of air-separation apparatus; to provide a method of and apparatus for removing deleterious impurities from refrigerated air which is to be rectified and which may be applied to existing air-separation apparatus without substantially interfering with the operation of or the construction of the rectifying apparatus; and for effecting the elimination of the impurities in such a manner that the rectification efficiency and yield of oxygen produced by a two-stage rectifying apparatus is substantially unaffected.

These and other objects and advantages of this invention will become apparent from the following description and the accompanying drawings in which:

Fig. 1 is a diagrammatic elevational view of an exemplary apparatus illustrating the principles of this invention applied to an air-separation apparatus having a single stage of rectification;

Fig. 2 is a similar view of another form of apparatus illustrating the principles of the invention applied to apparatus for rectifying air in two stages; and, Fig. 3 is a similar view of still another form of apparatus illustrating the application of the invention to two stage air-separation apparatus which is supplied with air at two different pressures.

In carrying out the principles of the present invention, as applied to air separation, the compressed and cooled air to be separated is treated prior to its admission to the rectifying column in such a manner that the impurities are thereby accumulated in a liquid which has a very high content of nitrogen. The removal of the impurities is carried out by washing or scrubbing the gaseous portions of the cold air with liquid air to insure that the impurities will be in the liquid portion of the air. Such impurity-containing liquid portion is then vaporized to concentrate the impurities and the impurity-free vapor produced by the vaporization is then passed into the rectifying apparatus, preferably into the first pressure stage thereof. The vaporization of the liquid portion of the entering air is preferably effected by heat exchange with the gaseous portion of the entering air, which gaseous portion is then passed into the higher pressure stage of the rectifying column in the customary manner. The impurities are removed from the vaporizer by withdrawing portions of liquid air therefrom either at predetermined intervals, or constantly at a relatively slow rate.

The essential features of the present invention are more particularly adapted to air-separation cycles producing liquid oxygen but they may also be applied to cycles producing gaseous oxygen. The procedure for removing the impurities, according to the invention, is characterized by the separation of the compressed and cooled incoming air into a substantially impurity-free vapor fraction and a liquid fraction carrying the impurities, the evaporation of the major part of the impurity-containing liquid fraction at a reduced pressure which pressure is preferably equal to or above that of the first stage of rectification, and employing the pressure difference to effect such vaporization by heat exchange with the impurity-free vapor fraction whereby all the air except an impurity-carrying concentrate may be passed into the same pressure stage of rectification and at the pressure at which the rectification apparatus is designed to operate. Such vaporization is effected by an irreversible heat flow which absorbs a certain quantity of energy.

If, in connection with a two-stage rectifying cycle, the liquid fraction is vaporized at a low-pressure substantially equal to that of the second stage and the vapors are passed into the low pressure stage for rectification, as set forth in the aforesaid copending application, the irreversible heat flow is effected at the expense of a certain quantity of potential energy of the second stage rectification, resulting in a slightly lower separation efficiency and a reduction of the yield of oxygen from a given quantity of air compressed.

According to the present invention the energy absorbed by the irreversible heat flow is supplied in a different way, which does not affect the separation efficiency, by employing a pressure drop in the incoming air. This results in a loss of refrigeration which can be overcome by increasing the head pressure or providing other means to make up the refrigeration loss. In any case there will be a certain increased total power cost for a given amount of impurity-free liquid oxygen produced.

The principles of the invention will be first described with reference to Fig. 1 in connection with a simple single stage of rectification, although this is not the rectification cycle for which the invention is most useful. The air may be prepared for rectification in the customary manner by compressing it to a relatively high pressure, removing its moisture and carbon dioxide content, and cooling it through countercurrent heat exchange with products of the separation to its condensation temperature, particularly in such a manner that a small portion of the air is liquefied. The air so prepared is introduced through a conduit 10 into the lower portion of a scrubber-separator 11. The scrubber-separator may have therein some form of gas and liquid contact means such as a series of perforated plates 12 and a liquid collecting cup 13. The air containing portions of liquid entering through conduit 10 in passing upward is thoroughly mixed. Such liquid and gas portions separate in the upper portion of the chamber 11 and the liquid flows into the cup 13 and is withdrawn therefrom through a connection 14 controlled by a pressure-reducing valve 15. The connection 14 conducts the liquid phase portion or fraction into a vaporizer 16 which comprises a chamber having therein a heating coil 17. A conduit 18 conducts the gaseous fraction of the air from the upper portion of the scrubber-separator 11 to the inlet of the heating coil 17. The outlet of the heating coil 17 is connected by a conduit 19 with the inlet of a heating coil 20 located in the kettle 21' at the lower end of a single stage rectifying column 21. A throttle valve 22 is interposed in the conduit 19. Vapors produced in the vaporizer 16 are withdrawn from the upper end thereof and passed into the heating coil 20 through a conduit 23 that joins the conduit 19 on the discharge side of the valve 22. The outlet end of the heating coil 20 is connected by a transfer line 24, controlled by a transfer valve 25, to the upper end of the rectifying column 21 which contains the customary form of rectifying trays 26. A separation product rich in nitrogen is withdrawn through a conduit 27 from the upper end of the rectifying column and an oxygen product is withdrawn through a connection 28 from a point just above the liquid level in the kettle 21' of the column. The liquid air in which the impurities are concentrated collects at the bottom of the vaporizer 16 from which it may be withdrawn through a valved connection 29 either continuously at a relatively slow rate or intermittently at predetermined intervals. The amount of liquid to be withdrawn is a relatively small proportion of the total liquid handled. If desired, however, such withdrawn liquid could be passed through suitable filtering devices to remove the impurities and the filtered liquid could then be returned to the apparatus.

It is believed that the operation of the impurities eliminating apparatus will be clear from the above description. The scrubber-separator 11 should be maintained under a pressure greater than the pressure under which the vaporizer 16 operates, the pressure difference being chosen so as to effect the desired heat exchange in the vaporizer 16. The liquid passing through valve 15 therefore is reduced in pressure. The valve 22 is used to control the pressure in coil 17 and in the scrubber-separator 11, and thereby the pressure difference between gas in coil 17 and the liquid surrounding it in vaporizer 16. Thus valve 22 constitutes the primary control on the liquid level in the vaporizer 16. In addition, if the liquid level in the vaporizer 16 should rise, such liquid will cover a greater area of the heating coil 17 and thus the vaporization will proceed at a faster rate. The system is therefore quite stable in operation. It is desirable that the valve 15 shall be opened only wide enough to pass enough of the liquid fraction entering the scrubber-separator 11 to prevent an excessive rise of the liquid level therein. If the valve 15 should be opened too wide, however, an excessive reduction of the liquid level will not take place because the liquid must reach the level of the upper end of the overflow cup 13 before it can be withdrawn. The valve 25 may be used to regulate the further condensation of liquid air that occurs in the heating coil 20. This condensation effects sufficient vaporization of the liquid in the kettle 20 to provide the gaseous oxygen product issuing at conduit 28 and also to furnish some vapors for rectification in the column 21. The liquid air passing through valve 25 partly flashes into vapor and the remaining cold liquid furnishes a reflux for the rectifying column.

It will be seen that no vapor (other than flash-off) is passed into the final stage of rectification and that the pressure reduction of the incoming air supplies the energy for effecting the heat exchange occurring in the vaporizer 16. The loss of refrigeration occasioned by the scrubber system may be counteracted by a suitable increase of the pressure to which the air is originally compressed in order that the column 21 may operate at proper rate.

Referring now to the form of the apparatus disclosed in Fig. 2, the portions of the impurity-removing apparatus which are designated with the numerals 11 to 18, inclusive, are substantially similar to the features previously described which are similarly designated in Fig. 1. In this form of the apparatus a two-stage rectifying apparatus A' is employed. Such apparatus A' is arranged to produce liquid oxygen and therefore the air which is introduced into the lower portion of the scrubber-separator 11 should contain a larger portion of liquid and preferably slightly more than 20 per cent. Due to the increased amount of scrubber liquid to be evaporated in the evaporator 16 a larger proportion of the air passed through the heater coil 17 will be liquefied. The air separation column A' therefore will be supplied with the requisite amount of air in the liquid phase.

The two-stage rectifying column A' may be of customary construction and comprise a lower column which operates under a pressure of about 75 pounds per square inch gauge and has therein rectifying trays 41 of the customary type. At the upper end of the lower column 40 is disposed a condenser 42, the interior portions of the condenser tubes of which receive gas from the lower column. Part of the gas condensed by the condenser 42 falls into the lower column and furnishes reflux liquid therefor. Another portion of the liquid produced by the condenser 42 is caught by a liquid nitrogen shelf 43. Such liquid rich in nitrogen is transferred through a transfer line 44 controlled by transfer valve 45 and passed to the upper end of a second stage rectifying column 46, also containing rectifying trays 47. Liquid containing most of the oxygen collects in the lower portion of the lower column 40 and is transferred therefrom through a transfer line 48 to a midpoint of the upper column 46. The transfer line 48 is controlled by a transfer valve 49. The liquid oxygen product of the second stage rectification collects in the chamber 50 surrounding the condenser 42 and communicating with the bottom of the upper column. The liquid oxygen product is withdrawn from the lower portion of the chamber 50 through a connection 51 which may conduct the liquid to suitable storage tanks or liquid-oxygen receiving devices. A nitrogen product of relatively high purity and containing substantially all the nitrogen of the air processed is withdrawn from the upper portion of the upper column through a conduit 52. Such cold nitrogen is preferably conducted in countercurrent heat exchange with the incoming air to cool all the air and partially liquefy a portion thereof. The conduit 19 conducts the portion of the incoming air resulting from partial condensation of the gaseous fraction in coil 17 directly into the lower column 40 and such flow may be controlled by an expansion valve 53 interposed in the conduit 19. The vapors produced in the vaporizer 16 by vaporization of the liquid fraction, are preferably passed directly to the lower column through a conduit 54 controlled by a valve 55. Conduits 54 and 19 may join to enter the lower portion of the column 40 at the same point. In normal operation, valve 55 is wide open so that the pressure in the evaporator 16 is substantially the same as in lower column 40.

If desired, some or all the vapors produced in the vaporizer 16 could be conducted to the upper column by opening valve 57 in a conduit 56; this however is ordinarily not advantageous because of its effect on the separation efficiency of the rectification.

The operation of the impurity-removal apparatus disclosed in Fig. 2 is substantially similar to that of Fig. 1. The operation of the scrubber-separator and the vaporizer is regulated by manipulation of the valves 15 and 53 in a manner substantially similar to the regulation of the valves 15 and 22 in Fig. 1. For starting operation and before sufficient liquid has formed to effect a proper scrubbing of the incoming air, it will be desirable to by-pass the rectifying apparatus such as by providing a connection 58 between conduit 18 and conduit 52 controlled by a valve 59 thereby preventing any impurity-containing air from reaching the column 40. The valve 59 is held open until the countercurrent cooling system attains temperatures low enough to produce the desired amount of liquid in the incoming air.

The impurity-removal system of the present invention may also be applied to rectifying apparatus producing gaseous oxygen. Such apparatus may be similar in principle to that shown in Fig. 2, but the cooled air supplied at conduit 30 may have only a relatively small proportion of liquid and the liquid withdrawal connection 51 would remain closed and a gaseous oxygen withdrawal connection 31 provided above the liquid level in the condenser chamber 50. Such gaseous oxygen product would be conducted in countercurrent heat exchanging relation to the air to be cooled in the customary manner to recover refrigeration from the gaseous oxygen product.

In some instances there may be insufficient liquid air contained in the incoming air to effect an efficient scrubbing of all the air and the desired removal of the impurities. If it should be desired on occasion to increase the supply of scrubber liquid, means for liquefying controllable portions of the incoming air may be provided. To this end the air-inlet conduit 30 may be provided with a regulating valve 32 and the conduit 30 may be provided on the inlet side of the valve 32 with a branch conduit 33 connected to one end of a heat exchange coil 34 disposed in the sump 35 or lower portion of the lower column 40. The other end of the coil 34 may be connected to the conduit 30 on the discharge side of the valve 32 by a conduit 36 which is controlled by a regulating valve 37. Thus, providing there is a supply of liquid in the sump 35, by regulating the valves 32 and 37 a desired amount of the incoming air can be by-passed through the coil 34 and thereby liquefied by heat exchange with the liquid in the sump 35. The heat exchange in the lower column 40 merely results in liquid circulation and does not affect rectification.

It is found that the operation of the air-separation apparatus with the impurity-removal system is more stable and less sensitive to disturbances due not only to the elimination of solidified substances from the rectifying apparatus but also to a stabilizing action of the scrubber-separator and vaporizer elements which deliver the incoming air to the rectifying column in a more uniform condition. As an example of the operating pressures, it is found suitable to maintain a pressure of about 140 pounds per square inch gauge in the scrubber-separator 11 when the pressure of the lower column 40 is maintained at about 75 pounds per square inch gauge. The pressure of the incoming air may be any pressure between about 500 pounds and 2,000 pounds per square inch gauge according to the type of compressing and cooling system employed. When producing liquid oxygen, the system customarily and preferably includes an expansion engine or engines and the discharge pressure of such engine will be that of the scrubber 11 instead of that of the lower column 40. Therefore the pressure difference between about 140 and 75 pounds per square inch represents approximately the increase in head pressure to counteract a loss of refrigeration caused by the necessity of expanding the incoming air to 140 pounds per square inch instead of to 75 pounds per square inch if no impurity-removal scrubber system were employed.

If all the refrigeration were obtained without the use of expansion engines, such for example, as by the use of an external refrigerating cycle, the introduction of the impurity-removing scrubber system would require no rise in head pressure of the air. If the air refrigerating system includes several expansion engines, it would not be necessary to introduce all the engine expanded air into the scrubber-separator but some of the engine expanded air could with advantage be introduced below the surface of liquid in the vaporizer 17 which would then serve as a scrubber-vaporizer. For example, a portion of throttle-expanded air and the exhaust of one expansion engine may be introduced at conduit 30 while the exhaust of a second expansion engine expanding to the lower pressure may be introduced at the lower end of the vaporizer 17.

In the embodiment of the invention illustrated in Fig. 3 the air to be rectified is supplied at two pressures, and both the high-pressure and the low-pressure air are scrubbed to separate the impurities therefrom before the air is introduced to the two-stage rectifying column. The high-pressure portion of air is compressed in a multi-stage air-compressor indicated diagrammatically at 60 and then is passed through a cooling and moisture removing apparatus indicated diagrammatically at 61. The apparatus 61 may be of the customary type including air cooling and refrigerating means and moisture separating traps. After elimination of moisture the air is passed through the high-pressure air-cooling tubes 62 of a countercurrent heat exchanger 63. The cooled and partly liquefied high-pressure air is then conducted by a conduit 64 to the lower portion of the scrubber-separator 66. Disposed within the lower portion of the scrubber-separator 66 are heat exchanger coils 65 and within the coils 65 is disposed an overflow cup 67. The overflow cup 67 maintains a liquid level in the scrubber that is about even with the upper coils of the heat exchanger 65. An expansion valve 68 is provided in the conduit 64 to expand the cooled high-pressure air to the pressure of the scrubber-separator 66.

A substantial amount of the air to be rectified is compressed to a relatively low pressure, moderately higher than the pressure of the first stage of rectification in a compressor generally indicated at 70. The low-pressure air is preliminarily cooled and freed of moisture by heat exchange in a cooling and moisture removing apparatus 71 similar to the apparatus 61 and is then passed through the low-pressure tubes 72 of the heat exchanger 63. From the tubes 72, the low-pressure air is conducted by a conduit 73 to the upper ends of the heat exchanger coils 65. A substantial portion of the high-pressure air which enters the scrubber 66 will flash into vapor due to the expansion through the valve 68 and such vapor will rise to the top of the scrubber 66. The liquid fraction will collect and rise in the scrubber 66 until it covers the coils 65 and overflows into the cup 67. The low-pressure air flowing through the coils 65 will be further cooled or desuperheated by vaporizing sufficient amounts of the scrubber liquid to provide the desired substantially large proportion of vapor fraction in the upper portion of the scrubber-separator 66. The coils 65 will also aid the scrubbing action by acting as gas and liquid contact surfaces. A conduit 74 having a valve 69 therein connects the lower ends of the coils 65 to the lower portion of a scrubber-vaporizer 77.

The scrubber liquid containing the impurities is withdrawn from the cup 67 through a conduit 75 which connects with the scrubber-vaporizer 77 and which is controlled by a valve 76. The vapors released and separated in the scrubber-separator 66 are conducted by a conduit 78 to the upper end of a vaporizing coil 79, disposed in the lower portion of the scrubber-vaporizer 77 and the lower end of coil 79 is connected by a conduit 80 with the lower column 40 of the rectifying apparatus A''. The conduit 80 is preferably controlled by an expansion valve 81. The vapors produced by the vaporization of the scrubber liquid in the scrubber-vaporizer 77 are conducted from the upper end of the vaporizer through a conduit 82 to the lower column 40 of the air-separation rectifying column. The conduit 82 is also preferably provided with a stop valve 89 which normally remains open. The impurities concentrated in liquid air are withdrawn from the lower portion of the vaporizer 77 by a drain connection 83.

The rectifying column A'' is substantially similar to the column A' shown in Fig. 2 and similar parts are similarly designated. The nitrogen product of the column is conducted by a conduit 52 to the nitrogen passages of the countercurrent heat exchanger 63, from which the nitrogen exits through the connection 84. The rectifying column A'' is arranged to preferably produce a gaseous oxygen product which is conducted from the upper portion of the chamber 50 by a conduit 85 to the tubes 86 of the countercurrent heat exchanger for the purpose of transferring the refrigeration of the oxygen product to the incoming air.

When first starting up the apparatus there may be no liquid present in the scrubber to ensure the separation of impurities, and to prevent any impurities from reaching the rectifying column A'', a suitable by-pass connection may be employed such as the connection 87 between the conduits 82 and the nitrogen conduit 52 and which is controlled by a valve 88. Thus when starting up the apparatus the valves 81 and 89 will remain closed and the valve 88 will be opened. The high-pressure air compressor 60 is started and the air compressed therein to a pressure of about 2000 pounds per square inch, is treated in the apparatus 61 to remove moisture and is then passed through the heat-exchanger tube 62 and the conduit 64 through the expansion valve 68 into the scrubber-separator 66, the great reduction in pressure causing the air to be refrigerated by the Joule-Thompson effect. Such cold expanded air then cools the coils 65 and passes through the conduit 75, valve 76, scrubber-vaporizer 77, conduits 82, 87, and 52 into the counter-current heat exchanger 63. The incoming air is thus readily cooled to liquefaction temperature and when liquefaction occurs, liquid will build up in the bottom of the scrubber 66 and overflow into the cup 67. The presence of liquid in the scrubber 66 may be indicated by a customary type of liquid-level indicating device connected to the scrubber 66 or the presence of liquid may be judged by slightly opening the valve 83 for, as soon as liquid passes out through the connection 75, it will fall to the bottom of the vaporizer 77 and some will flow out through the drain 83. It will then be desirable to close the drain 83 to build up a body of liquid in the scrubber-vaporizer in order to liquefy vapor in the coil 79 and to scrub the low-pressure air. It will next be preferable to open valve 81 enough to pass clean cold air and liquid into the rectifying columns and build liquid to the proper level in the lower column and in the upper column by sufficiently opening the transfer valves 49 and 45. The low-pressure compressor 70 may then next be started and the valve 89 opened and valve 88 closed. With transfer valves 45 and 49 opened to the proper degree, the rectifying column A'' will be placed into operation in the customary manner with air which has been freed of impurities.

During normal operation, the high-pressure air is scrubbed free of impurities in the scrubber separator 66 and the low-pressure air is scrubbed free of impurities in the scrubber-vaporizer 77. The impurity-containing liquid-air fraction of the high-pressure air passes through the connection 75 into the vaporizer 77 and is there substantially completely vaporized by heat exchange with the gaseous fraction of the high-pressure air entering and passing through the heating coil 79. The proportion of liquid is relatively small as compared to the gas. Therefore, the gas in the coil 79 under a pressure slightly higher than the pressure of the lower column 40 contains more than enough heat to vaporize all the liquid that is passed over into the scrubber-vaporizer 77, which operates under a pressure substantially the same as the pressure of the lower column 40. The valves 76 and 81 are preferably adjusted so that the flow through the conduit 75 is sufficient to carry over all of the liquid formed in the scrubber 66, but it is preferable that very little gas shall pass over with the liquid. The impurity-containing liquid is preferably drained from the connection 83 at predetermined intervals rather than at a steady rate.

In order to disclose the broad principles of the invention, several embodiments thereof have been illustrated and described. Certain features of the invention may be used independently of others and changes may be made without departing from the essentials of the invention. For example, although the impurity-removal system is specifically adapted for use in connection with air separation, the principles involved may be employed to remove relatively higher boiling impurities when effecting the separation of other gas mixtures. Also, by separating the impurities according to the invention, it will not be necessary to effect a complete preliminary elimination of carbon dioxide from the air and it is contemplated that by the employment of a suitable air refrigerating system the preliminary removal of carbon dioxide may be avoided and all the carbon dioxide content of the air removed after solidification by the scrubber system together with the other impurities.

I claim:

1. A method for eliminating higher boiling point impurities in the separation of air by rectification at low temperatures which comprises compressing, cooling, and partially liquefying the air to be separated; scrubbing the gaseous portion of the cooled air with the liquid portion to concentrate said impurities substantially entirely in the liquid portion; separating the liquid containing said impurities from the gaseous portion; vaporizing a major part of said liquid by heat exchange with said gaseous portion to form a concentrate of said impurities; withdrawing such impurity containing concentrate; and passing the impurity free material of said gaseous portion and the vapors of said vaporization into a rectifying apparatus for separation into oxygen and nitrogen containing products.

2. A method for eliminating higher boiling point impurities in the separation of air by rectification according to claim 1 which includes the step of reducing the pressure of said liquid portion before said vaporization.

3. A method for eliminating higher boiling point impurities in the separation of air by rectification according to claim 1 which includes the steps of reducing the pressure of said liquid portion before said vaporization; and reducing the pressure of said material of the gaseous portion after said heat exchange effecting said vaporization.

4. A method for eliminating higher boiling point impurities in the separation of air by rectification according to claim 1 in which a relatively small portion of gaseous air in addition to all of said liquid containing the impurities is separated and subjected to said heat exchange.

5. A method for eliminating higher boiling point impurities in the separation of air by rectification according to claim 1 in which said heat exchange is conducted so that a part of said gaseous portion is liquefied, the amount so liquefied being the substantial equivalent of the liquid contained in the original cooled and partly liquefied air.

6. A method for eliminating higher boiling point impurities in the separation of air by rectification according to claim 1 in which, prior to the formation of sufficient liquid for effecting efficient scrubbing of said cooled air and prior to normal operation, all the gaseous air is by-passed directly to the nitrogen-rich product outlet from the rectifying apparatus.

7. A method for eliminating relatively higher boiling point impurities in the separation of a gas mixture by liquefaction and rectification at low temperatures which comprises compressing, cooling and partially liquefying the impurity-containing gas mixture to be separated; scrubbing the gaseous portion of the cooled mixture with the liquid portion to concentrate said impurities substantially entirely in the liquid portion; separating the liquid portion containing said impurities from the gaseous portion; vaporizing a major part of said liquid portion by heat exchange with said gaseous portion to form a concentrate of said impurities; withdrawing such impurity containing concentrate; and passing the impurity-free material of said gaseous portion and the vapors of said vaporization into a rectifying apparatus for separation of said gas mixture.

8. A method for eliminating relatively higher boiling point impurities in the separation of air by rectification at low temperatures in two successively lower pressure stages which comprises compressing, cooling, and partially liquefying the impurity-containing air to be separated; effecting intimate inter-mixing of the liquid fraction with the gaseous fraction of the air to concentrate said impurities substantially entirely in said liquid fraction; separating the major part of said impurity-free gaseous fraction from said liquid fraction at an intermediate pressure; vaporizing a major part of said liquid fraction at a pressure lower than said intermediate pressure by heat exchange with said gaseous fraction to form a concentrate of said impurities; withdrawing such impurity containing concentrate; and passing the impurity-free material of said gaseous fraction after a reduction of pressure and the impurity-free vapors of said vaporization to the higher pressure stage of said rectification.

9. A method for eliminating relatively higher boiling point impurities in the separation of air by rectification in two successively lower pressure stages according to claim 8 in which said higher pressure stage of rectification is effected at a pressure of about 75 pounds per square inch gauge and said intermediate pressure is maintained at about 140 pounds per square inch gauge.

10. A method for eliminating relatively higher boiling point impurities in the separation of air by rectification at low temperatures in two successively lower pressure stages which comprises compressing, cooling, and partially liquefying at a relatively high pressure a portion of the air to be separated; expanding such portion of the air to an intermediate pressure; separating such portion of air into an impurity-free gaseous fraction and an impurity-containing liquid fraction; compressing and cooling under a pressure lower than said intermediate pressure, another portion of the air to be separated; scrubbing said cooled other portion at said lower pressure with said liquid fraction to remove impurities from said other portion and concentrate said impurities substantially entirely in said liquid fraction; vaporizing a major part of said liquid fraction at said lower pressure by heat exchange with said gaseous fraction to separate a concentrate of said impurities; and thereafter passing all the air except said concentrate to said higher pressure rectification stage.

11. Apparatus for eliminating higher boiling impurities prior to the separation of air by rectification at low temperatures which comprises a scrubber-separator for scrubbing the gaseous portion of compressed, cooled, and partly liquefied air to be separated with the liquefied portion of such air; a vaporizer; means for passing substantially all the liquid fraction containing said impurities from said scrubber-separator to said vaporizer for vaporization therein; means for passing the impurity-free gaseous fraction of air from said scrubber-separator into heat exchange with the liquid in said vaporizer; means for withdrawing an impurity containing concentrate from said vaporizer; a rectifying apparatus; means for passing material of said gaseous fraction from said heat exchange to said rectifying apparatus; and means for passing the vapors produced in said vaporizer to said rectifying apparatus.

12. Apparatus for eliminating higher boiling impurities prior to the separation of air according to claim 11, in which said means for passing the liquid fraction from said scrubber-separator to said vaporizer is provided with expansion valve means.

13. Apparatus for eliminating higher boiling impurities prior to the separation of air according to claim 11, in which said scrubber-separator comprises a chamber having gas and liquid contact means intermediate its ends, an inlet for the air below said contact means, and means for collecting the liquid fraction containing the impurities from the upper portion of said contact means.

14. Apparatus for eliminating higher boiling impurities prior to the separation of air according to claim 11 in which said rectifying apparatus is provided with a nitrogen-enriched product outlet; and means is provided for by-passing the gaseous portion of the air from said scrubber-separator directly to said nitrogen outlet during the period of starting before normal operation.

15. Apparatus for eliminating higher boiling impurities prior to the separation of air according to claim 11 in which said rectifying apparatus is provided with lower and upper columns for operation at two successive pressure stages; and in which said means for passing vapors from said vaporizer to said apparatus includes a branch connectible to said upper column.

16. Apparatus for eliminating higher boiling impurities prior to the separation of air according to claim 11 in which means is provided for supplying the air at two pressures; and said scrubber-separator comprises a chamber having an inlet at the lower portion thereof for the higher-pressure portion of air, a heat exchanger coil in the lower portion of said chamber arranged for receiving the lower-pressure portion of air and passing the same after heat exchange with the contents of said chamber into the lower portion of said vaporizer, and means for reducing the pressure of said liquid fraction to the pressure of said lower-pressure air when passed into said vaporizer.

17. Apparatus for eliminating higher boiling impurities prior to the separation of air according to claim 11 in which said rectifying apparatus is provided with lower and upper columns for operation at two successive pressure stages; and which includes a heating coil disposed in the lower portion of said lower column; and means for by-passing a desired part of the incoming air through said heating coil for increasing the proportion of liquid in said incoming air.

18. Apparatus for eliminating higher boiling impurities prior to the separation of air by rectification at low temperatures which comprises a scrubber-separator chamber; a vaporizer chamber having heat exchange means therein; an inlet for cooled and partly liquefied air at the lower portion of said scrubber-separator chamber; valve controlled means for withdrawing liquid from an intermediate level of said scrubber-separator chamber to insure the presence of a body of liquid therein and for passing such liquid into said vaporizer chamber; means for passing gaseous air from the upper portion of said scrubber-separator chamber to said heat exchange means; a rectifying apparatus; valve-controlled means for passing gas material from said heat-exchange means to said rectifying apparatus; means for passing vapors from said vaporizer to said rectifying apparatus; and means for draining a concentrate of said impurities from the lower portion of said vaporizer.

19. Apparatus for eliminating higher boiling impurities prior to the separation of air by rectification at low temperatures which comprises a scrubber-separator for scrubbing the gaseous portion of compressed, cooled, and partly liquefied air to be separated with the liquefied portion of such air; a vaporizer, said vaporizer comprising a chamber having a liquid collecting space in the lower portion thereof, means for withdrawing a concentrate of said impurities from said liquid collecting space, and heat-exchange means in said chamber having a gas passage therethrough, at least a portion of said heat exchange means being in said liquid space of said chamber; means for passing substantially all the liquid fraction containing said impurities from said scrubber-separator to the liquid collecting space of said vaporizer for evaporation therein; means for passing the impurity free gaseous fraction of air from said scrubber-separator through the gas passage of said heat exchange means in said vaporizer; a rectifying apparatus; means for passing material of said gaseous fraction from said heat exchange means to said rectifying apparatus; and means for passing the vapors produced in said vaporizer to said rectifying apparatus.

HAROLD T. ROSS.